(12) United States Patent
Fritz et al.

(10) Patent No.: US 7,296,187 B1
(45) Date of Patent: Nov. 13, 2007

(54) HARDWARE DEBUG DEVICE HAVING SCRIPT-BASED HOST INTERFACE

(75) Inventors: David Fritz, Weatherford, TX (US); Blane Fowler, Weatherford, TX (US)

(73) Assignee: Zilog, Inc., San Jose, CA (US)

( * ) Notice: Subject to any disclaimer, the term of this patent is extended or adjusted under 35 U.S.C. 154(b) by 643 days.

(21) Appl. No.: 10/619,644

(22) Filed: Jul. 14, 2003
(Under 37 CFR 1.47)

(51) Int. Cl.
*G06F 11/00* (2006.01)

(52) U.S. Cl. ....................................... 714/31
(58) Field of Classification Search ................... 714/31
See application file for complete search history.

(56) References Cited

U.S. PATENT DOCUMENTS

| | | | |
|---|---|---|---|
| 5,321,828 A | 6/1994 | Phillips et al. | 395/500 |
| 5,410,686 A * | 4/1995 | Kish | 714/30 |
| 5,479,652 A * | 12/1995 | Dreyer et al. | 714/30 |
| 5,701,488 A | 12/1997 | Mulchandani et al. | 395/704 |
| 5,892,941 A * | 4/1999 | Khan et al. | 703/22 |
| 5,937,154 A * | 8/1999 | Tegethoff | 714/30 |
| 6,094,221 A | 7/2000 | Anderson | 348/231 |
| 6,243,711 B1 | 6/2001 | Wu et al. | 707/104 |
| 6,263,373 B1 * | 7/2001 | Cromer et al. | 709/250 |
| 6,470,349 B1 | 10/2002 | Heninger et al. | 707/102 |
| 6,519,605 B1 | 2/2003 | Gilgen et al. | 707/103 |
| 6,571,358 B1 * | 5/2003 | Culotta et al. | 714/33 |
| 6,581,191 B1 | 6/2003 | Schubert et al. | 716/4 |
| 6,651,204 B1 * | 11/2003 | Rajsuman et al. | 714/738 |
| 6,973,592 B2 * | 12/2005 | Debling | 714/30 |
| 6,978,410 B1 * | 12/2005 | Parnas | 714/724 |
| 7,146,539 B2 * | 12/2006 | Hildebrant | 714/30 |
| 2003/0120974 A1 * | 6/2003 | Adams et al. | 714/31 |

OTHER PUBLICATIONS

"The Zen of Diagnostics"; The Ganssel Group; publishe din Embedded Systems Programming, Jun. 1990; http://www.ganssle.com/articles/adiags1.htm.*
Web pages from the Wind River Systems, Inc. web site (www.windriver.com), 15 pages (downloaded Jul. 2003).
Tornado API 2.0 Programmer's Guide, Wind River Systems, Inc., pp. 160-167 directed to the Gopher scripting language, Mar. 22, 1999.
"Z8Encore Microcontrollers with Flash Memory and 10-Bit A/D Converter" Preliminary Product Specification, Zilog, Inc, pp. 151-164 (2003).

* cited by examiner

*Primary Examiner*—Scott Baderman
*Assistant Examiner*—Joshua Lohn
(74) *Attorney, Agent, or Firm*—Imperium Patent Works; T. Lester Wallace; Darien K. Wallace

(57) ABSTRACT

A hardware debug device is usable to debug a target such as a microcontroller or microprocessor. A host instructs the hardware debug device what tests to perform on the target by sending a non-compiled script of text across a standardized script-based interface. The hardware debug device receives and interprets the script and sends appropriate microcommands to the on-chip debugger of the target to carry out actions specified by the script. The syntax of the interpreted script language is rich and allows scripts to define complex looping and testing actions. New scripts can be written to accommodate different target processors without changing the hardware debug device. Because complex testing operations are performed by the hardware debug device, network traffic at the host is reduced. The use of the interpreter and scripts also allows the cost of the hardware debug device to be reduced and reliability of the device to be increased.

35 Claims, 7 Drawing Sheets

```
HOST COMMAND: CC_SETMEMORY(Address, len, data)
/**
* Writes data to the target's physical memory based on the provided data (parameter px).
PXFERSPDU is a structure used to hold the address, data and other specifics needed to carry out the
write.
*/
void msWritePhysical (PXFERSPDU px)
{
    BOOL fCancelled;
    short wResplen;
    ULONG lAddress;
    USHORT nBytes, wDatalen;
    UCHAR *pSrc;

/* initialize */
fCanceled = FALSE;
wResplen = 0;

/* set data length from px param */
wDatalen =
    px->pktlen -
    sizeof(px->spdu.memsetl.address) -
    sizeof(px->spdu.memsetl.array.nbytes);
/* set address to write to from px param */
lAddress = ulswap(px->spdu.memsetl.address);
/* set number of bytes to write from px param */
nBytes = unswap(px->spdu.memsetl.array.nbytes) + 1;
/* set data to write from px param */
pSrc = px->spdu.memset1.array.bytes;

/* save the values of the PC and ADL */
SaveReg((ULONG)(EZ80_PC_MASK | EZ80_ADL_MASK));
/* force ADL mode */
tpSetRegisterByte(EZ80_ADL_MASK, 1);
/* write the data to target memory */
z8WritePhy(lAddress, nBytes, pSrc, wDatalen);
/* restore PC and ADL */
RestoreReg(ULONG)(EZ80_PC_MASK | EZ80_ADL_MASK));

/* return the response of the request was not cancelled */
if (!fCancelled)
    xioRespond(wResplen);
}

/**
* Write to physical memory.
*/
BOOL Z8WritePhy(ULONG lAddress, USHORT, nBytes, UCHAR *pBuff, USHORT wDatalen)
{
    BOOL fCancelled = FALSE;
    UCHAR *pSrc;
    USHORT nDatacnt, nHostBrkCnt;

nDataCnt = 0;
    nHostBrkCnt = HOST_BRK_CNT;
    pSrc = pBuff;
```

FIG. 3A
(PRIOR ART)

```
/* Set starting adr... */
tpSetRegisterLong(EZ80_PC_MASK, lAddress);
/* for the number of bytes to be written, write each byte */
do {
    /* write a byte to target */
    tpWriteMemAtPC(*pSrc++);

/** Loop through source buffer until requested number of bytes written. */
    nDatacnt++;
    if (nDatacnt >= wDatalen)
    {
        nDatacnt = 0;
        pSrc = pBuff;
    }
    if (--nHostBrkCnt == 0)
    {
        nHostBrkCnt = HOST_BRK_CNT;
        if (fCancelled = xioHostBreak(0))
            break;
    }
} while (--nBytes);
    return(fCancelled);
}
/** Write a byte at the address held by the PC **/
void tpWriteMemAtPC(BYTE bData)
{
    ZDIWrite(ZDIW_MEMORY, bData);
}
/** Write the given byte to the target at the given address **/
void ZDIWrite(UCHAR address, UCHAR data)
{
    TURN_LED_ON(LED_COMM);
    /* this does the actual write of the byte */
    *pZdiDataPort = data;
    ckZDIbusy();
    WriteZDIaddr(address);
    TURN_LED_OFF(LED_COMM);
}
/** Write an address to the target **/
void WriteZDIaddr(UCHAR addr)
{
    /* this does the actual setting of the address **/
    *pZdiAdrPort = addr;
    ckZDIbusy();
}
```

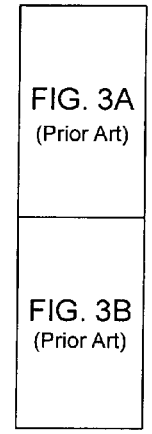

FIG. 3B
(PRIOR ART)

```
R16=07V07=R10|(R11<<8)|(R12<<10)        ; Save PC in DTLi variable V07
   V06=(R03&10)>>4                       ; Save ADL in DTLi variable V06
R15=UAddr R14=HiAddr R13=LoAddr R16=87   ; Set start memory location
R16=(Adl&01)?08:09                       ; Set current ADL
.[]=data_byte_count:data                 ; Set the data to the internal buffer
R30=[0:@]                                ; Write Buffer to target memory
R13=V07R14=V07>>8R15=V07>>10             ; Resore PC
R16=87R16=(V06&1)?08:0                   ; Restore ADL
```

FIG. 7

```
R16=07V07=R10|(R11<<8)|(R12<<10)V06=(R03&10)>>4R15=0R14=0R13=0R16=87R16=(1&01)?
08:09RFA=01.[]=9:7f7f7f7f7f7f7f7f7fR30=[0:@]
RFA=00R13=V07R14=V07>>8R15=V07>>10R16=87R16=(V06&1)?08:0
```

FIG. 8

| PRECEDENCE | OPERATORS | ASSOCIATIVITY |
|---|---|---|
| 1 | [ ] | LEFT |
| 2 | ! ~ ++ -- - (UNARY) | RIGHT |
| 3 | * / % | LEFT |
| 4 | + - | LEFT |
| 5 | << >> | LEFT |
| 6 | < <= > >= | LEFT |
| 7 | == != | LEFT |
| 8 | & | LEFT |
| 9 | ^ | LEFT |
| 10 | \| | LEFT |
| 11 | && | LEFT |
| 12 | \|\| | LEFT |
| 13 | ?: | RIGHT |
| 14 | = | RIGHT |

FIG. 9

| BUFFER+0 | BUFFER+1 | BUFFER+2 | MEANING |
|---|---|---|---|
| '\x01' .. '\x0f' | | | Repeat ASCII hexadecimal byte (buffer+1 & buffer+2) the number of times specified by buffer+0. Up to 15 times. |
| '\x81' | nn | | Repeat ASCII hexadecimal byte (buffer+2 & buffer+3) the number of times specified by buffer+1 (binary nn). Up to 256 times. |
| '\x82' | nn | mm | Repeat ASCII hexadecimal byte (buffer+3 & buffer+4) the number of times specified by (buffer+1 <<8)|(buffer+2)(binary nnmm). Up to 65535 times. |
| ANY OTHER CHARACTER | | | The data byte is the ASCII hexadecimal value of buffer+0 and buffer+1 |

FIG. 10

HARDWARE DEBUG DEVICE HAVING SCRIPT-BASED HOST INTERFACE

CROSS-REFERENCE TO COMPACT DISC APPENDIX

Compact Disc Appendix, which is a part of the present disclosure, is one recordable Compact Disc (CD-R) containing information that is part of the disclosure of the present patent document. The Compact Disc contains source code for a script interpreter that executes on a hardware debug device in accordance with an embodiment of the present invention. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights

TECHNICAL FIELD

The present invention relates to testing and debugging processor systems.

BACKGROUND INFORMATION

Hardware debugging devices are often employed in the debugging of electronic systems involving digital processors. Such hardware debugging devices are usable to identify hardware defects in a new system, to debug and develop software for a new system, and to load software onto systems both in testing environments and in production environments.

FIG. 1 (Prior Art) is a simplified diagram of one type of conventional hardware debug device 1. Hardware debug device 1 is coupled via an ethernet network connection 2 to a host computer 3. Host computer 3 may, for example, be a workstation that runs an operating system 4. Hardware debug device 1 is also coupled, for example via a ribbon cable or other type of connection 5, to a target processor 6. Target processor 6 is embedded in and is a part of the system to be debugged.

An engineer or software developer sitting at host computer 3 can generate software code to be executed on target processor 6 of the new system. When the code is ready to be loaded into program memory on the system, the host computer 3 sends an appropriate memory load command to hardware debug device 1. This memory load command may, for example, include a starting address field, a length field, and a data field. The memory load command is, for example, sent in the form of the data payload of a TCP/IP network packet across the network connection 2 to hardware debug device 1. To do this, the engineer or software engineer may use a software debugger program 7 that is an application program executing on the host computer. The protocol processing stack 8 of host computer 3 handles the protocol processing necessary to transfer the load memory command over network connection 2 to hardware debug device 1.

Hardware debug device 1 receives the command, identifies it as a memory load command, and then executes a corresponding software routine 9 that causes a load memory action to be performed. In the example of FIG. 1, hardware debug device 1 has a real time operating system 10 as well as a stack 11 for handling the protocol processing associated with receiving the command and passing it up to debug routine 9. Debug routine 9 is an application program, or part of an application program, executing on hardware debug device 1.

Debug routine 9 carries out the load memory action by causing on-chip debugging hardware 12 on target processor 6 to perform certain sub-actions. In the case of a load memory command, sub-actions may include writing individual words into individual program memory locations. Many such sub-actions may be required to carry out one load memory action.

On-chip debugging hardware 12 recognizes certain debug commands that are received onto the on-chip debugging hardware 12 in serial fashion through a serial interface of the on-chip debugger. One of the commands is a command to write to a program memory location. Debug routine 9 therefore causes hardware debug device 1 to send the appropriate write-to-program-memory commands to the on-chip debugging hardware 12 such that the on-chip debugging hardware causes a block of code to be written into the appropriate block of program memory, one address location at a time. The commands understood by on-chip debugging hardware 12 of the target that cause the sub-actions to be carried out are referred to here as "microcommands." The commands sent from host computer 3 to hardware debug device 1 that instruct the hardware debug device to perform the higher level action are referred to here as "macrocommands."

Typical on-chip debugging hardware supports numerous microcommands other than the write-to-program-memory microcommand. Such microcommands may include, for example, microcommands to stop the target processor, single-step the target processor, read and write to various internal registers within the target processor, read and write to data memory, set breakpoints in code executed by the target processor, stuff instructions into the target processor, read and write watchpoints, read status registers, and otherwise exercise and monitor the target processor. These microcommands are usable to carry out sub-actions involved in executing other macrocommands.

Although the hardware debug device 1 of FIG. 1 has an operating system, other conventional hardware debug devices have debug routines or code that execute without an operating system. One such hardware debug device 13 is illustrated in FIG. 2 (prior art). The overall function of the debug routine 14 in the example of FIG. 2 is similar to the function of the debug routine 9 in the example of FIG. 1 in that it receives macrocommands from the host computer and issues microcommands to the target that cause a desired action to be performed. The hardware debug device 13 of FIG. 2 can, however, be more robust and reliable in that instability problems associated with the operating system 10 are avoided. Moreover, hardware debug device 13 can often be made to be less expensive because the hardware debug device 13 of FIG. 2 need not entail the memory necessary to store the often large operating system program.

One example of hardware debug device 13 of FIG. 2 is the "ZPAK" development tool available from Zilog, Inc. of San Jose, Calif. For additional information on the ZPAK device, see the "ZPAK Datasheet" ZDI23200ZPK, which can be found on the Zilog.com web site. One example of the on-chip debugging hardware 12 of FIG. 2 is the on-chip debugger (OCD) available in the Z8 family of 8-bit microcontrollers available from Zilog, Inc. For additional information on such an on-chip debugger, see the "Z8Encore Microcontrollers with Flash Memory and 10-bit A/D Converter" Preliminary Product Specification, and more specifically the chapter entitled "On-Chip Debugger". This Preliminary Product Specification is available on the Zilog.com web site.

FIG. 3 sets forth an example of source code for a firmware routine that handles a load memory macrocommand. The source code is compiled into a block of object code that is then executed by an eZ80 processor of hardware debug device 13 of FIG. 2.

Although hardware debug devices such as those set forth above work well in certain environments and for certain purposes, these hardware debug devices have certain problems. For example, different target processors from the same manufacturer or from different manufacturers may have different on-chip debugging hardware. These different on-chip debuggers may have different capabilities, require different microcommands, and use different communication interfaces and protocols. If an engineer or software developer has a given hardware debug device that is designed to work with one type of target processor, and if the engineer or software developer wishes to switch to a different type of target processor, then the debug routines in the hardware debug device may need to be modified or replaced. One hardware debug device may not work with multiple different kinds of target processors. It may, for example, be desirable not to have to modify the hardware debug device when upgrading from one processor in a family of target processors to the next processor in the same processor family, yet the hardware debug device may not function with the new type of target. This inflexibility associated with the hardware debug devices of FIGS. 1 and 2 is undesirable.

FIG. 4 (prior art) is a diagram of a hardware debug device 15 that has increased flexibility. Rather than sending macrocommands to hardware debug device 15, lower level commands are sent from host computer 16 to the hardware debug device. These lower level commands give the hardware debug device 15 increased flexibility because one set of microcommands can be sent that allow the hardware debug device to interface with a first type of target, whereas a second set of microcommands can be sent that allow the hardware debug device to interface with a second type of target. Much of the processing that was performed in the hardware interface device in the examples of FIGS. 1 and 2 is performed on host computer 16.

Although a system such as the system of FIG. 4 may overcome inflexibility problems associated with the hardware debug devices of FIGS. 1 and 2, systems such as the system of FIG. 4 suffer from other problems. There is, for example, increased information flow between the hardware debug device and the host computer. Because the host computer is performing more monitoring functions in the example of FIG. 4, speed of communication across the network connection 2 between the hardware interface device and the host computer becomes increasingly important. In a packet-based protocol such as TCP/IP, a small payload often cannot be sent without involving a considerable amount of protocol processing overhead and a considerable amount of information flow across the network. In the case where the target processor is sending a large number of small pieces of information back to the host computer via the hardware debug device, the corresponding large number of packets can slow the communication between the hardware debug device and the host computer to undesirably low levels.

Moreover, it is generally not desirable to require the host computer to monitor large volumes of communications from the target processor. It is preferable to have the hardware debug device offload the host computer of low level tasks. Having the hardware debug device handle debugging and testing actions on behalf of the host computer frees up processing power of the host computer for other uses. For example, an engineer using a workstation on the network who sets in motion a particular test of a target processor may not want the workstation to slow down during the running of the test because the workstation is receiving a large number of TCP/IP packets back from the hardware debug device.

Accordingly, an improved hardware debug device is sought that is flexible, fast, inexpensive, and reliable.

SUMMARY

A hardware debug device is usable to debug a target system, and/or develop software for a target system, and/or to load software onto a target system in either a test or production environment. The hardware debug device communicates with a target processor embedded in the target system by sending microcommands to the target processor. In one embodiment, the microcommands are debug commands understood by on-chip debugging (OCD) hardware on the target processor integrated circuit.

The hardware debug device also communicates with a host computer. In one embodiment, the hardware debug device communicates with the host computer over a network connection such as an Ethernet network over which TCP/IP packets pass.

A novel script interpreter in accordance with one embodiment of the present invention executes on the hardware debug device. The script interpreter receives from the host computer a script of non-compiled text that adheres to a predefined syntax. The script is received over the network in the form of a payload of a packet. The interpreter receives the script, interprets the script in accordance with the predefined syntax, and run-time translates the script into the target microcommands necessary to carry out the subactions defined by the script. The microcommands are sent to the on-chip debugging hardware on the target processor. The on-chip debugging hardware receives the microcommands, executes them, and returns any information as dictated by the microcommands themselves.

The syntax of the script language is feature-rich and allows a script the ability to define actions involving multiple complex nested loops. It allows a script to define complex tests involving variables, and constants, and arithmetic operations. It allows a script the ability to read or write an OCD register, to read or write to program memory on the target, to read or write to data memory on the target, and to communicate information from the hardware debug device back to the host computer.

By using scripts to perform complex debugging and monitoring tasks on the hardware debug device, information flow between the hardware debug device and the host computer is reduced. Where the network TCP and IP protocols are used to communicate with the host computer, significant processing power on the host computer can be saved because the number of network packets that require TCP and IP protocol processing by the host computer is reduced.

Not only does the script-based interface between the hardware debug device and the host computer reduce network congestion and save host computer processing power, but the script-based interface also facilitates the use of the same hardware debug device to debug multiple different types of target processors. In contrast to the compiled routines (see FIGS. 1 and 2) of conventional hardware debug devices that are directed to carrying out the action of one particular macrocommand, the very same interpreter code in one embodiment of the present invention can interpret both a first script for performing a test on a first type of target processor as well as a second script for performing the test on a second type of target processor. Scripts can be readily changed to act on different types of target processors, and this can be done without modifying the hardware debug device, without compiling or linking any code, and without changing any software executing on the hardware debug device.

In addition to providing flexibility and control over the precise debug tests performed, use of the script-based interface also allows the cost of the hardware debug device to be reduced. In one embodiment, the interpreter is a statically linked block of C/C++ code that does not require operating system support. Because the hardware debug device involves no real time operating system, the cost of providing memory to store and support the operating system is avoided. Cost of the hardware debug device is further reduced because licensing fees required to use an operating system of a third party need not be incurred. Moreover, performance of the hardware debug device is improved because crashes and slow boot times often associated with operating systems are avoided.

Information retrieved or collected by the operation of a script can be sent back to the host computer for analysis on the host computer. In one example, such information is placed in a data buffer. The contents of the data buffer are then transferred to debugger software executing on the host computer. An engineer or software developer uses the debugger software on the host computer to examine and analyze the reported information. In one embodiment, a engineer or software developer can write a script on the host computer in the form of a text character string in an ordinary text file. The script is sent to the interpreter on the hardware device by sending the text file over the network connection to the hardware debug device.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 (prior art) shows firmware executed on the hardware debug device when a macrocommand is received onto the hardware debug device of FIG. 2.

FIG. 7 is a diagram showing a single script that is broken up into multiple lines. Comments have been added for readability purposes.

FIG. 8 shows how the script of FIG. 7 might look when it is sent from the host computer to the hardware debug device.

FIG. 9 sets forth operator precedence and associativity of one particular script syntax.

FIG. 10 is a table that shows the compression encoding used to send information from the hardware debug device to the host computer in accordance with one embodiment.

DETAILED DESCRIPTION

Reference will now be made in detail to some embodiments of the invention, examples of which are illustrated in the accompanying drawings.

Figure 5:
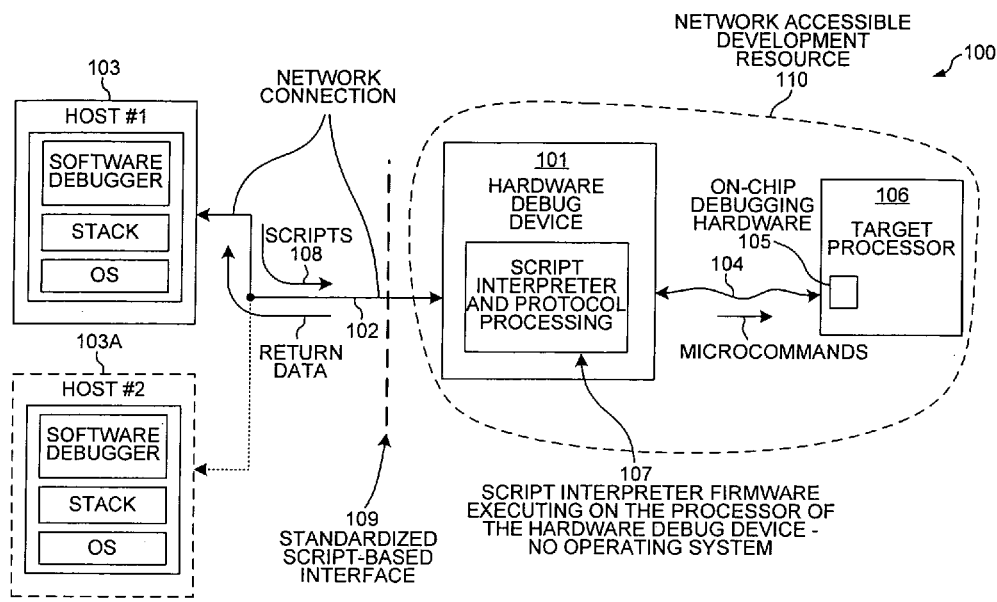
FIG. 5 is a simplified diagram of a hardware debug device in accordance with one embodiment of the present invention. The hardware debug device has a script-based host interface.

FIG. 5 is a simplified diagram of a system 100 in accordance with one embodiment of the present invention. System 100 includes a hardware debug device 101 that is coupled by a TCP/IP/Ethernet network connection 102 to a host computer 103. Due to network connection 102, hardware debug device 101 can also communicate with other host computers on network 102 such as, for example, host computer 103A.

Hardware debug device 101 is also coupled by an appropriate cable or connection 104 to on-chip debugging (OCD) hardware 105 of a target processor 106. Cable or connection 104 may, for example, include a ribbon cable and may include a signal-conditioning module. Target processor 106 is embedded in a system that is being debugged and/or for which software is being developed.

Figure 1:
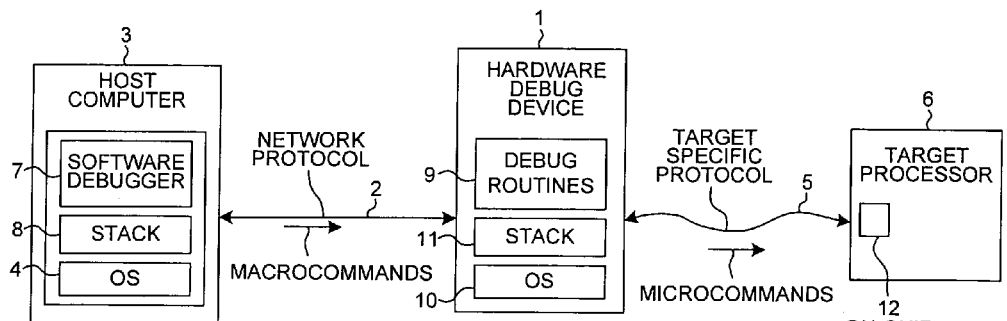
FIGS. 1 and 2 (prior art) are simplified diagrams of conventional hardware debug devices.
Figure 2:
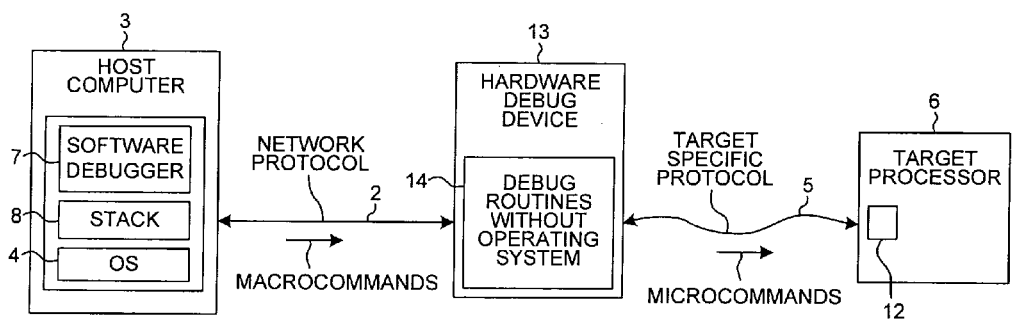
Figure 4:
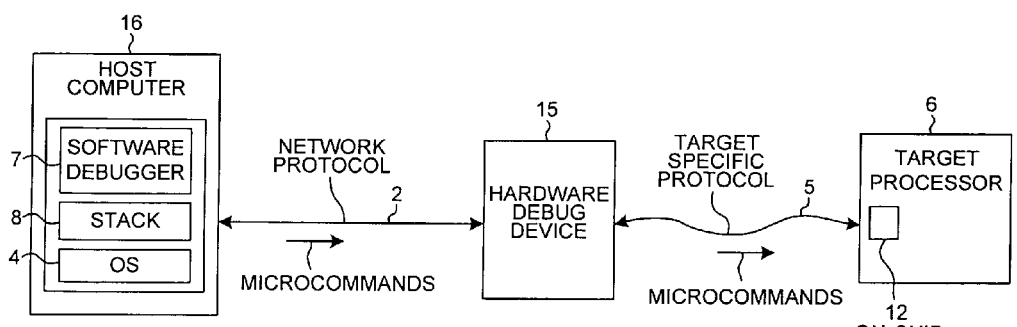
FIG. 4 (prior art) illustrates one conventional approach to improving the flexibility of a debugging system.

Hardware debug device 101 includes a script interpreter 107 such that hardware debug device 101 communicates with host computer 103 on network 102 via a script-based interface 109. Script interpreter 107 receives scripts 108 from host computer 103 into a text buffer and interprets the scripts in sequence, one by one. Each script is a terse, non-compiled string of text that is communicated across network 102 as the data payload of one TCP/IP packet. Whereas the macrocommands in the conventional systems of FIGS. 1 and 2 are relatively high-level macrocommands that result in relatively fixed and predetermined high-level actions being performed by routines of precompiled code executing on the hardware debug device, the syntax usable to write scripts in accordance with the embodiment of FIG. 5 is feature-rich and contains the ability to define complex actions involving loops, nested loops, sleep commands, break commands, variables, and constants. The syntax allows an action defined by a script to include many different types of arithmetic operations and tests, to read and write to OCD registers, to read and write to program memory on the target, to read and write to data memory on the target, and to communicate information from the hardware debug device back to the host computer. The feature-richness of the syntax allows a script to specify the low-level specific details of a new and different complex action to be carried out. For additional information on the script syntax, see the description below entitled "SCRIPT SYNTAX".

In accordance with one embodiment, applicability of a particular script from one type of target processor to a second type of target processor is possible simply by modifying the text characters of the script where the script is stored in a file on the host computer. Once modified, the script is sent from host computer 103 to hardware debug device 101 such that new actions suitable for testing the second type of target processor are carried out. Due to the flexibility of the script-based interface 109 and the script syntax, scripts can often be written to work with different types of target processors without making any modifications to any software on hardware debug device 101. New scripts can be created and interpreted with out compiling any code or changing the hardware debug device 101 in any way.

Multiple different types of target processors are supported by a single hardware debug device. In one embodiment, the host computer stores a set of different scripts, one for each different type of target processor. The set of different scripts is stored on the host computer (for example, on a hard disk) where there is a large amount of inexpensive storage available, as opposed to being stored on the hardware debug device 101 where there is a relatively small amount of storage available.

In one embodiment, a manufacturer of microcontrollers and/or microprocessors maintains a network accessible development resource 110 involving hardware debug device 101 and one or more target processors 106. In this case, the target processors may not be embedded into a new system, but rather are provided on standard development printed circuit boards. The network accessible development resource 110 is accessible via the internet through network 102. A user (such as a potential purchaser of microcontrollers) located in a remote location can then access the network accessible development resource 110 and work with a desired target processor without having to obtain or set up a hardware debug device and a target processor.

In the embodiment of FIG. 5, script interpreter 107 is firmware executing on an eZ80 processor (not shown) of hardware debug device 101. Script interpreter 107 is written as source code in the C++ language. The source code is compiled into a statically linked object code library. The statically linked code executes on the eZ80 processor without a real time operating system. Because there is no operating system, hardware debug device 101 can be made less expensive than would otherwise be the case if hardware debug device 101 had to include large amounts of memory necessary to store and support a real time operating system. Performance problems such as crashes and slow boot times that are associated with some operating systems are also avoided by not having an operating system. In addition to performance reasons, avoiding the use of an operating system allows hardware debug device 101 to have a standardized and generic interface without having to pay licensing fees to third parties who control common operating systems.

Figure 6:
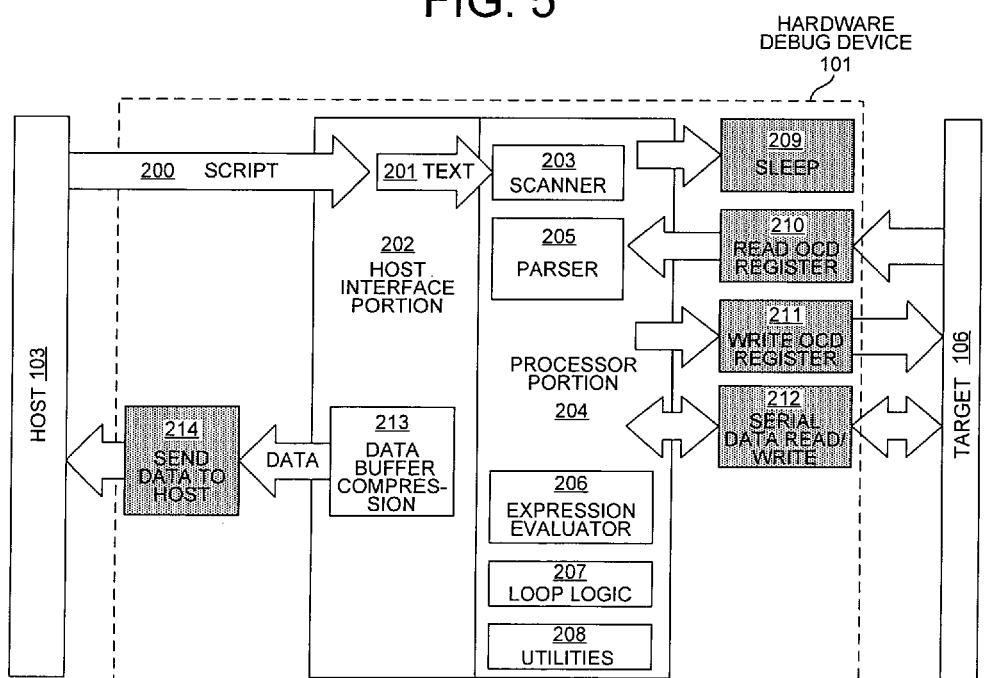
FIG. 6 is a block diagram showing various component parts of the interpreter that executes on the hardware debug device of FIG. 5.

FIG. 6 is a simplified block diagram that illustrates parts of interpreter 107. The darkened blocks indicate callback functions. A script is received 200 from host computer 103 and the text of the script is extracted and passes 201 from the host interface portion 202 of the interpreter to the scanner block 203 of the processor portion 204 of the interpreter. The text is scanned 203 and parsed 205. Depending on the results of the parsing, various modules (including an expression evaluator module 206, a loop logic module 207 and a utilities module 208) are involved to interpret the script. Depending on the script, the callback functions sleep 209, read OCD register 210, write OCD register 211, and serial data read/write 212 can be used. The sleep function suspends processing for an amount of time specified in the script. The read OCD register function reads and returns the values of an OCD register. The write OCD register function writes a given value into an OCD register. The read/write serial data function writes and/or reads data from a serial data interface. Information to be sent to host computer 103 is compressed by module 213 and is sent to host computer 103 by the send data to host callback function 214.

A single 64 KB data buffer is used to send results of test actions and other information to host computer 103. The syntax allows a script to read from and/or write to the data buffer. The data buffer contents persist across the processing of multiple scripts unless and until a successfully processed script requests that it be reset (logically emptied). The contents of the data buffer make up the bulk of a data response to the requesting host when a successfully processed script requests that the data be returned to the host.

Whereas FIG. 3 shows code executed by the conventional hardware debug device of FIG. 2 in carrying out a load memory macrocommand, FIG. 7 shows a script that performs a similar action. The script causes the value 7F to be written nine times into memory on the target, starting at address 0x000000. The script is broken into multiple lines and comments are included to improve readability. The script is actually sent from the host computer to the hardware debug device as a single compact sequence of text characters without the comments or spaces.

FIG. 8 shows how the script looks when it is transmitted from the host computer to the hardware debug device.

Script Syntax

There are many different types of syntax that can be used to provide a standardized script-based interface such as script-based interface 109 of FIG. 5. One particular script syntax is described below for instructional and illustrative purposes. In the description below, the syntax is called DTLs (Data Transfer Language Syntax), the interpreter is called DTLi (Data Transfer Language Interpreter), and the script language is called DTL (Data Transfer Language).

As set forth above in connection with FIG. 5, to exercise and debug a target processor, the host computer sends scripts that meet the DTLs syntax to the DTLi interpreter of the hardware debug device. The DTLi interprets the scripts and then carries out any necessary communications with the target. Communications between the hardware debug device and the target use the protocol and debug microcommands supported by an on-chip debugger of the target.

The DTLs syntax supports the efficient reading and writing of registers in the target, the efficient reading and writing of large blocks of memory on the target, and auto-incrementing of addresses within the on-chip debugging logic of the target. The DTLs syntax also supports querying by the host of the DTLi interpreter to receive and an indication of: the DTLs version that is supported, the maximum length of a DTLs data buffer, the maximum number of DTL variables, and the success or failure of each DTL script. DTLs and the DTLi interpreter. support at least ten levels of nesting of parenthetical expressions and at least ten levels of nested loops.

All operations within the DTLs language are fully blocking such that no operating system support is needed or used. Accordingly, the DTLi interpreter is a monolithic block of statistically linked compiled C/C++ code that executes on the hardware debug device without any operating system.

DTLs assumes that scripts received from the host computer onto the DTLi interpreter are presented as NULL terminated ASCII text. DTLs assumes the existence of a single DTLs data buffer. All data written to or read from the target device, as well as all data written or read by the host, passes through this DTLs data buffer. Data is stored in the DTLs data buffer in binary form. For information flow from the hardware debug device to the host, the DTLi interpreter manipulates the binary data and then sends it to the host in a compressed ASCII format. A data buffer index is maintained that holds the index of the next unused byte in the data buffer.

DTLs Expressions: The DTLs expressions that appear in the syntax definitions below are thirty-two bits wide. If an operation is performed on a value less than eight bits wide, then the value is zero-extended to thirty-two bits by the DTLi interpreter. Because the data buffer elements are eight bits wide, expressions placed into the data buffer are truncated to eight bits.

DTLs Variables: The variables used in DTLs are thirty-two bits in length. The variables are designated in the syntax definitions as: Vnn, where nn is a two-digit hex value. Some implementations of the DTLi interpreter may not support the full range of V00 to Vff. The minimum number of supported DTLs registers is eight. DTLs variables can be used in any DTLs expression.

OCD Registers: OCD registers are registers within the on-chip debugger of the particular target processor. These registers have particular predetermined functionalities associated with monitoring and debugging the particular target processor. In this example, the target processor is a Z8 microcontroller available from Zilog, Inc., of San Jose, Calif., and the OCD registers are the OCD registers of the on-chip debugger within the Z8 microcontroller. Each OCD register is eight bits wide and has the form: Rnn, where nn is a two digit hex value in the range of 00 to ff. When Rnn appears in the right-hand-side of an assignment, the DTLi interpreter will wait until the value of the register has been received before continuing evaluation.

Constants: DTLs supports two types of constants, hexadecimal and character. Hexadecimal constants are one to eight digits in length and are made up of the digits 0 . . . 9 and A . . . F. Lower case letters a . . . f are not allowed. Character constants have the form: '<char>', where <char> is a single ASCII character.

Spaces and Tabs: Spaces and tabs in an incoming DTLs script are ignored.

The types of operators allowed in the DTLs syntax are set forth below.

'@'—Current Data Buffer Index Operator: The '@' symbol is a sixteen-bit value that represents the current data buffer index.

Arithmetic Operators: All arithmetic operators assume thirty-two bit signed values. The arithmetic operators usable in the DTLs syntax are listed below.

expression '++'—Post-increment: The '++' operator increments the value of expression after it is used. Expression must be: Vnn, Rnn, @, [expression], or [ ].

expression '--'—Post-decrement: The '--' operator decrements the value of expression after it is used. Expression must be: Vnn, Rnn, @, [expression] or [ ].

'-' expression—Negate: The unary '-' (negate) operator performs a thirty-two bit two's compliment on expression. If expression is Rnn, @, [expression] or [ ], it is zero-extended to thirty-two bits prior to the negation.

'~' expression—Compliment: The unary '~' operator performs a thirty-two bit one's compliment on expression. If expression is Rnn, @, [expression] or [ ] it is zero-extended to 32-bits prior to the operation.

expression1 '+' expression2—Addition: The binary '+' operator performs a thirty-two bit addition on expression1 and expression2. If expression1 or expression2 are Rnn, @, [expression] or [ ], then they are zero-extended to thirty-two bits prior to the operation.

expression '-' expression—Subtraction: The binary '-' operator performs a thirty-two bit subtraction on expression1 and expression2. If expression1 or expression2 are Rnn, @, [expression] or [ ] they are zero-extended to thirty-two bits prior to the operation.

expression '*' expression—Multiply: The binary '*' operator performs a thirty-two bit unsigned multiplication on expression1 and expression2. If expression1 or expression2 are Rnn, @, [expression] or [ ] they are zero-extended to 32-bits prior to the operation.

expression '/' expression—Divide: The binary '/' operator performs a thirty-two bit unsigned division of expression1 by expression2. If expression1 or expression2 are Rnn, @, [expression] or [ ] they are zero-extended to thirty-two bits prior to the operation.

expression '%' expression—Modulo: The binary '%' operator performs a thirty-two bit unsigned modulo on expression1 by expression2. If expression1 or expression2 are Rnn, @, [expression] or [ ], then they are zero-extended to thirty-two bits prior to the operation.

expression '&' expression—AND: The binary '&' operator performs a thirty-two bit bitwise AND operation expression1 and expression2. If expression1 or expression2 are Rnn, @, [expression] or [ ], then they are zero-extended to thirty-two bits prior to the operation.

expression '|' expression—Inclusive OR: The binary '|' operator performs a thirty-two bit bitwise OR operation expression1 and expression2. If expression1 or expression2 are Rnn, @, [expression] or [ ], then they are zero-extended to thirty-two bits prior to the operation.

expression '^' expression—Exclusive OR: The binary '^' operator performs a thirty-two bit bitwise exclusive OR operation expression1 and expression2. If expression1 or expression2 are Rnn, @, [expression] or [ ], then they are zero-extended to thirty-two bits prior to the operation.

expression '<<' expression—Shift Left: The binary '<<' operator performs a thirty-two bit shift left operation on expression1 by the number of bits specified by expression2. If expression1 is Rnn, @, [expression] or [ ], then it is zero-extended to thirty-two bits prior to the operation.

expression '>>' expression—Shift Right: The binary '>>' operator performs a logical (unsigned) thirty-two bit shift right operation on expression1 by the number of bits specified by expression2. If expression1 is Rnn, @, [expression] or [ ], then it is zero-extended to thirty-two bits prior to the operation.

expression1 '?' expression2 ':' expression3—Conditional Operator: The binary '?' operator gives the value of expression2 if expression1 is non-zero, otherwise it gives the value of expression3. If expression2 or expression3 are Rnn, @, [expression] or [ ], then they are zero-extended to 32-bits prior to the operation.

Boolean Operators: Boolean operators assume thirty-two bit signed operands and produce a "1" if the expression is true and "0" if it is false. The boolean operators usable in the DTLs syntax are as follows.

expression '>' expression—Greater Than: The binary '>' operator performs an unsigned thirty-two bit comparison of expression1 and expression2 and returns "1" if expression1 is greater than expression2, otherwise "0" is returned. If expression1 or expression2 are Rnn, @, [expression] or [ ], then they are zero-extended to thirty-two bits prior to the operation.

expression '<' expression—Less Than: The binary '<' operator performs an unsigned thirty-two bit comparison of expression1 and expression2 and returns "1" if expression1 is less than expression2, otherwise "0" is returned. If expression1 or expression2 are Rnn, @, [expression] or [ ], then they are zero-extended to thirty-two bits prior to the operation.

expression '>=' expression—Greater or Equal: The binary '>=' operator performs an unsigned thirty-two bit comparison of expression1 and expression2 and returns "1" if expression1 is greater than or equal to expression2, otherwise "0" is returned. If expression1 or expression2 are Rnn, @, [expression] or [ ], then they are zero-extended to thirty-two bits prior to the operation.

expression '<=' expression—Less or Equal: The binary '<=' operator performs an unsigned thirty-two bit comparison of expression1 and expression2 and returns "1" if expression1 is less than or equal to expression2, otherwise "0" is returned. If expression1 or expression2 are Rnn, @, [expression] or [ ], then they are zero-extended to thirty-two bits prior to the operation.

expression '==' expression—Equal: The binary '==' operator performs an unsigned thirty-two bit comparison of expression1 and expression2 and returns "1" if expression1 is equal to expression2, otherwise "0" is returned. If expression1 or expression2 are Rnn, @, [expression] or [ ], then they are zero-extended to thirty-two bits prior to the operation.

expression '!=' expression—Not Equal: The binary '!=' operator performs an unsigned thirty-two bit comparison of expression1 and expression2 and returns "1" if expression1 is not equal to expressions, otherwise "0" is returned. If expressions or expressions are Rnn, @, [expression] or [ ], then they are zero-extended to thirty-two bits prior to the operation.

'!' expression—Boolean Not: The unary '!' operator returns "1" if expression is equal to zero, otherwise "0" is returned.

expression1 '&&' expression2—Boolean AND: The binary '&&' operator returns "1" if expression1 and expression2 are both non-zero, otherwise "0" is returned.

expression '||' expression—Boolean OR: The binary '||' operator returns "1" if either expression1 or expression2 are non-zero, otherwise "0" is returned.

'('expression')'—Parenthesis Grouping: The parenthesis operator is used for grouping expressions. The result is the value of expression. If expression is Rnn, @, [expression] or [ ], then it is zero-extended to thirty-two bits.

'['expression']'—Buffer Reference: The '[' expression ']' operator references the nth zero-based byte of the DTLs data buffer where n is the value of expression. If it appears in the left-hand-side of an assignment then the next data buffer entry is written. Otherwise, the value of the next data buffer byte is read. Using this operator does not affect the data buffer index.

'[ ]'—Auto increment data buffer reference: The '[ ]' operator is equivalent to [@++]. This symbol references the next available byte of the DTLs data buffer. If it appears in the left-hand-side of an assignment then the next data buffer entry is written. Otherwise, the value of the next data buffer byte is read. In either case the data buffer index is post incremented.

FIG. 9 sets forth operator precedence and associativity. Because the ++ and -- operators are right associative, a special case occurs when statements using the prefix ++ and -- operators appear immediately after an expression. Consider for example: [ ]=V00++R01. When this occurs the DTLi interpreter flags a syntax error because it cannot determine whether [ ]=(V00) ++R01 is intended, or if [ ]=(V00++) R01 is intended. Parenthesis should be used to disambiguate the expression.

DTLs Statements: A DTLs "script" is made up of one or more DTLs "statements." DTLs statements do not require a statement terminator. For example, a semicolon (;) is required to terminate C and C++ statements, but there is no such requirement for DTLs statements. The following statement types are possible.

'.'—Reset Data Buffer Index Statement: The '.' symbol represents the reset data buffer index statement. This statement causes the data buffer index to be set to zero, thereby effectively discarding the buffer's contents. This statement is equivalent to @=0.

'$'—Send Data Buffer Statement: The '$' symbol represents the send data buffer statement. When this statement is executed, the contents of the data buffer from the beginning of the buffer up to, but not including, the current data buffer index (@) are sent to the host. When the send data buffer statement is encountered, the contents of the data buffer are sent immediately then processing resumes at the next statement. The format of the data sent to the host from the DTLi interpreter can be in a compressed form and is preceded by status and error information.

++lvalue and --lvalue—Increment/Decrement Statements: The post increment/decrement statements are equivalent to lvalue=lvalue+1 and lvalue=lvalue-1. The lvalue may be Rnn, Vnn, @, [expression] or [ ].

lvalue "=" rvalue—Assignment Statement: The assignment statement assigns the value of the expression in rvalue to lvalue. The lvalue may be Rnn, Vnn, @, [expression], [ ], \ or \\.

Below is an example:
. [ ]=00 [ ]=11 V01=[1] [0]=V01 $
Reset buffer index.
buffer[0]=00.
buffer[1]=11.
Variable V01=buffer[1].
buffer[0]=V01.
Send buffer (11,11) to host.

'[' [index_expression] ':' [length_expression] ']' '=' '"' constant_list '"'—ASCII Block Load to Buffer: This form of assignment statement performs a block load of constant data to the buffer. Here, index_expression is the starting index within the buffer to access the data to be written. Length_expression is the number of bytes to write. If the value of length_expression does not match the number of bytes in constant_list, then an error occurs. Constant_list has the form: "aabbccdd . . . nn", where each pair (e.g. aa) represents a two-digit hexadecimal number. This string may be compressed. If index_expression is omitted, then zero is assumed. If length_expression is omitted, then it is assumed to be the number of bytes in constant_list. It is also possible to omit both expressions and the colon (:) as shown in the second example below. This is equivalent to [@:nn], where nn is the number of bytes is constant_list. At the end of this statement @ is set to index_expression+length_expression.

First Example:
. [0:3]="00112233" $
1. Reset buffer index.
2. buffer[0]=00, buffer[1]=11, buffer[2]=22, buffer[3]=33.
3. Send buffer (00,11,22,33) to the host.
Second Example:
. [ ]="00112233" $
1. Reset buffer index.
2. buffer[0]=00, buffer[1]=11, buffer[2]=22, buffer[3]=33.
3. Send buffer (00,11,22,33) to the host.

'[' [index_expression] ':' [length_expression] ']' '=' size ':' byte_list—Binary Block Load to Buffer: This form of assignment statement performs a binary block load of constant data to the buffer. Here, index_expression is the starting index within the buffer to access the data to be written and length_expression is the number of bytes to write. If the value of length_expression does not match the size bytes in byte_list then an error occurs. Byte_list is a list of binary bytes of data. If index expression is omitted then zero is assumed. If length-expression is omitted it is assumed to be the number of size bytes. At the end of this statement @ is set to index_expression+size.

First Example:

. [0:3]=4:0123$
1. Reset buffer index.
2. buffer[0]=30, buffer[1]=31, buffer[2]=32, buffer[3]=33.
3. Send buffer (30,31,32,33) to the host.

Second Example:

. [ ]=4:0123$
1. Reset buffer index.
2. buffer[0]=30, buffer[1]=31, buffer[2]=32, buffer[3]=33.
3. Send buffer (30,31,32,33) to the host.

Rnn '=' '[' [index_expression] ':'[length_expression] ']'—Block Write to Register: This assignment statement performs a block transfer of data from the buffer to a single register. Here, index_expression is the starting index within the buffer to access the data to be written and length_expression is the number of bytes to write. If index_expression is omitted then zero is assumed. If length expression is omitted it is assumed to be @. At the end of this statement, © is set to index_expression+length_expression.

Example:

. [ ]="00112233" R16=[0:@]
1. Reset buffer index.
2. buffer[0]=00, buffer[1]=11, buffer[2]=22, buffer[3]=33.
3. R16=00, R16'=11, R16"=22, R16'"=33.

'[' [index_expression] ':' length_expression ']' '=' Rnn—Block Read From Register: This assignment statement performs a block transfer of data from a single register to the buffer. Here, index_expression is the starting index within the buffer to place the data read and length_expression is the number of bytes to read. Consecutive reads from the register are stored in consecutive bytes of the buffer (e.g. @ is incremented after each byte is placed into the buffer). If index_expression is omitted then zero is assumed. If length_expression is omitted an error is generated. At the end of this statement, @ is set to index_expression+length_expression.

Example:

. [0:0A]=R20 $
Reset buffer index.
buffer[0]=R20, buffer[1]=R20', buffer[2]=R20", buffer[3]=R20'".
Send the buffer to the host.

'S' '=' '[' [index_expression] ':'[length_expression] ']'—Block Write to Serial: This assignment statement performs a block transfer of data from the buffer to the serial port. Here, index_expression is the starting index within the buffer to access the data to be written and length_expression is the number of bytes to write. If index_expression is omitted then zero is assumed. If length_expression is omitted it is assumed to be @. At the end of this statement, @ is unchanged.

Example:

. [ ]=4:0123 S=[0:@]
1. Reset buffer index.
2. buffer[0]=30, buffer[1]=31, buffer[2]=32, buffer[3]=33.
3. serial port write of 0, then 1, then 2, then 3.

'S' [index_expression2] ':' [length_expression2] ']' '=' '[' [index_expression1] ':' [length_expression1] ']'—Block Write to Serial with Immediate Read From Serial: This assignment statement performs a block transfer of data from the buffer to the serial port. Here, index_expression1 is the starting index within the buffer to access the data to be written and length_expression1 is the number of bytes to write. Here, index_expression2 is the starting index within the buffer to place read data and length_expression2 is the number of bytes to read from the serial port. If index_expression1 is omitted then zero is assumed. If length_expression1 is omitted it is assumed to be @. If index_expression2 is omitted then zero is assumed. If length_expression2 is omitted it is assumed to be maximum buffer size−index_expression2. At the end of this statement, @ is set to index_expression2+length_expression2.

Example:

. [ ]=4:0123 S[0:A]=[0:@]
1. Reset buffer index.
2. buffer[0]=30, buffer[1]=31, buffer[2]=32, buffer[3]=33.
3. serial port write of 0, then 1, then 2, then 3.
4. buffer gets 10 bytes read from serial port written into it starting at index 0.

'S' ':' size '=' '[' [index_expression] ':' [length_expression] ']'—Block Write to Serial with Immediate Read From Serial: This assignment statement performs a block transfer of data from the buffer to the serial port and append the buffer starting at @. Here, index_expression is the starting index within the buffer to access the data to be written and length_expression is the number of bytes to write. Here, size is the number of bytes to read from the serial port. If index_expression is omitted then zero is assumed. If length_expression is omitted it is assumed to be @. At the end of this statement, @ is set to @+size.

Example:

. [ ]=4:0123 S:A=[0:@]
1. Reset buffer index.
2. buffer[0]=30, buffer[1]=31, buffer[2]=32, buffer[3]=33.
3. serial port write of 0, then 1, then 2, then 3.
4. buffer gets 10 bytes read from serial port written into it starting at @.

'S' '=' size ':' byte_list—Binary Block Load to Serial: This form of assignment statement performs a binary block load of constant data to the serial port. Byte_list is simply a list of binary bytes of data. At the end of this statement, @ is unchanged.

Example:

S=4:0123
1. serial port gets 0, then 1, then 2, then 3.

'S' [index_expression] ':' [length_expression] ']' '=' size ':' byte_list—Binary Block Load to Serial with Immediate Read from Serial: This form of assignment statement performs a binary block load of constant data to the serial port then a read from serial into the buffer. Here, index_expression is the starting index within the buffer to place read data and length_expression is the number of bytes to read from the serial port. Byte_list is simply a list of binary bytes of data. If index_expression is omitted then zero is assumed. If length_expression is omitted it is assumed to be maximum buffer size−index_expression. At the end of this statement, @ is set to index_expression+length_expression.

Example:

S[0:A]=4:0123
serial port write of 0, then 1, then 2, then 3.
buffer gets 10 bytes read from serial port written into it starting at index 0.

'S' ':' size2 '=' size1 ':' byte_list—Binary Block Load to Serial with Immediate Read from Serial: This form of assignment statement performs a binary block load of constant data to the serial port then a read from serial into the buffer. Here, size2 is the number of bytes to read from the serial port. Byte_list is simply a list of binary bytes of data. At the end of this statement, @ is set to @+size2.

Examples:

S:A=4:0123 serial port write of 0, then 1, then 2, then 3.

buffer gets 10 bytes read from serial port written into it starting at @.

'{' [expression] ':' statement_list '}'—Loop Statement: An expression and a list of DTLs statements surrounded by braces ({ and }) defines a loop. Each statement within the braces is repeated the number of times indicated by expression. If expression is omitted then the loop repeats forever or until it is interrupted by a new DTLs script.

Example: The following script fills the data buffer with 16-bit values read from OCD registers R20 and R21. OCD register R10 determines how many 16-bit values are read.

. { R10 : [ ]=R20 [ ]=R21 } $

Reset the data buffer index '@'.

Read the value of the OCD register R20 and place it into the data buffer, incrementing '@'.

Read the value of the OCD register R21 and place it into the data buffer, incrementing '@'.

Repeat steps 2 through 3 the number of times specified by the contents of OCD register R10.

Send the entire buffer contents to the host.

Example: This script swaps the bytes of the buffer and sends them to the host machine:

V00=@/2 . {V00 : V01=[@] [ ]=[@+1] [ ]=V01} $

V00=number of bytes in buffer/2.

Reset @.

V01=current byte in buffer; don't increment @.

Current byte in buffer=next byte in buffer; increment @.

Next byte in buffer=V01 (the previous byte in buffer).

Repeat steps 3 through 5 the number of times specified by V00.

Send the swapped bytes to the host.

Example: The following is an example of an infinite loop:

{:.[ ]=R14$_3E8}

Reset @.

Read R14 into Buffer[@].

Send Buffer to the host.

Sleep for 1 second (3E8 milliseconds).

Repeat steps 1 through 4 until interrupted.

'\\' [expression]—Exit Statement: If expression is zero then the statement is ignored. If expression is non-zero, then processing of the script halts with an error code equal to expression. If expression is omitted, then the script exits with an error code of 00.

Example:

\\ (V00 > 10 ? FF : 00)

Exit with error code of FF if V00 > 10 otherwise don't exit. Parenthesis are necessary here because of the precedence of the "?" operator.

Example:

\\

Exit with error code 00.

'\' expression—Break Statement: If expression is zero then the statement is ignored. If expression is non-zero, then the current loop is exited. If the break statement occurs outside of a loop, then an error is generated.

Example:

. {10: [ ]=@ \ @ = =5} $

Reset @.

Buffer[@]=@.

Break out of loop if @ = =5.

Repeat steps 2 through 3, 16 times.

'_' expression—Sleep Statement: Expression represents the number of milliseconds to sleep before processing continues. This statement invokes the fpSleep callback and is useful for removing polling operations from the host computer's responsibility.

Example:

{100:. [ ]=R00_3E8$}

Reset @.

Place contents of R00 into Buffer[@].

Sleep for 1 second (3E8 milliseconds).

Send buffer to host.

Repeat steps 1 through 4, 256 times.

'#'—Receive Configuration Information Statement: The '#' symbol represents the "receive configuration information" statement which places VVRRvvsssstttt into the data buffer at the current location:, where: VV is a two-digit major version number; RR is a two-digit minor revision number; vv is a two-digit hex number representing the number of variables supported by the DTLi interpreter; ssss is a four-digit hex number representing the maximum size of the data buffer; tttt is a four-digit hex number representing the maximum size of a DTLs text script that can be processed by the DTLi interpreter.

Example:

.#$

This statement sends "01010804000100" to the host. The first "0101" indicates that the DTLi interpreter supports DTLs version 01.01. The next "08" indicates that there are eight variables (V00 . . . V07) supported. The next "0400" 0x0400 (1024) indicates the maximum buffer size. The last "0100" 0x0100 (256) indicates the maximum size of the script.

For each script received on the DTLi interpreter, the DTLi interpreter returns an indication of success or failure. If an error occurs while processing a script, then an error number is returned along with the failure status. The error number is a two-ASCII character code that indicates the type of failure.

DTLs uses a run-length encoding compression technique to reduce the amount of data transferred from the host to the hardware debug device and from the hardware debug device to the host. FIG. 10 is a table that shows how the encoding is accomplished. When the '$' statement is executed, the buffer contents are compressed in this way. The host decompresses communications received from the DTLi interpreter of the hardware debug device. Similarly, the host compresses scripts before sending scripts to the DTLi interpreter on the hardware debug device.

To remove the burden of polling for status and events from the host, the interpreter has the ability to perform such operations. To accommodate this, infinite loops and the sleep command is used. The sleep command allows the interpreter to suspend for a number of milliseconds. The intent is to not bombard the target with polling requests, but instead to check the status of the target at timed intervals. When the sleep command is used with an infinite loop, polling will continue until the script is interrupted. The break command can also be used in an infinite loop to check status returned from the target as shown in the following example:

. { : [ ]=R14 \ [00] = = 80_3E8} $

This script resets the data buffer index and then enters an infinite loop. Within the loop, status is read from register R14 and placed in the data buffer. If the value placed in the buffer is 80H, then the script breaks out of the loop and the contents of the data buffer is returned to the host computer. If R15 !=80H, the interpreter sleeps for 3E8H (1000) milliseconds and loops again.

A similar script can be used for polling without a timeout. In the following script, an unsuccessful status will be returned to the host computer if 80H is not returned from the target within 30 seconds:

. [ ] = 00 { 1E : [00] = R14 \ [00] + + 80_3E8} $

It may be necessary at times to stop script processing before completion, particularly if long polling scripts are executing. To support this, the interpreter will immediately stop processing any script once a new script is received. Upon review of a new script, the interpreter will be re-initialized and processing will begin on the new script. All other state information, including the data buffer index, data buffer contents, and variable contents, will be retained.

Although the standardized script-based interface is set forth and explained above in connection with a hardware debug device that is separate from the host computer and the target, advantages of the script-based interface can be realized in other types of systems.

Figure 11:
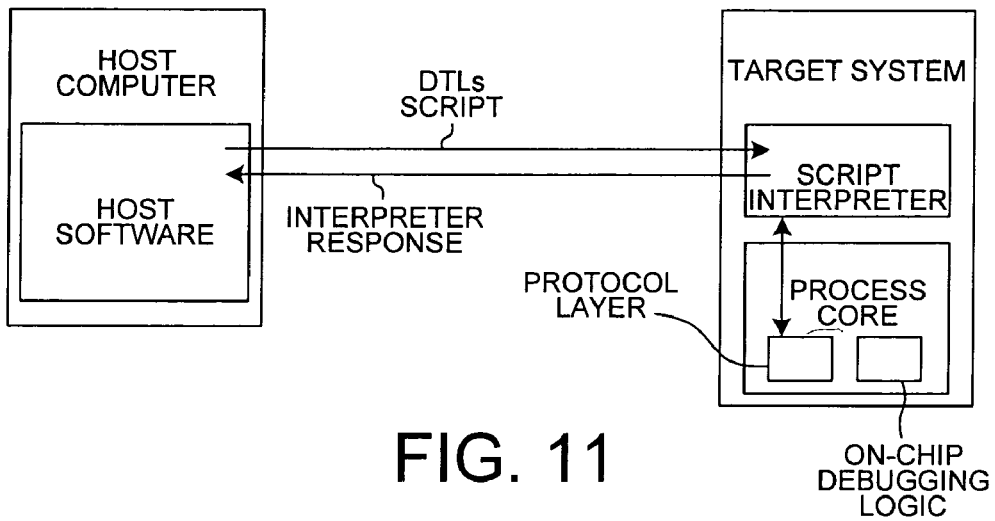
FIGS. 11 and 12 show other systems involving script-based interpreters in accordance with other embodiments.

FIG. 11 illustrates a system where the script interpreter is a part of the target system. The script interpreter may, for example, be firmware executed by the processor of the target system. The target system may, for example, be an evaluation/development board provided by a processor manufacturer to a prospective customer.

Figure 12:
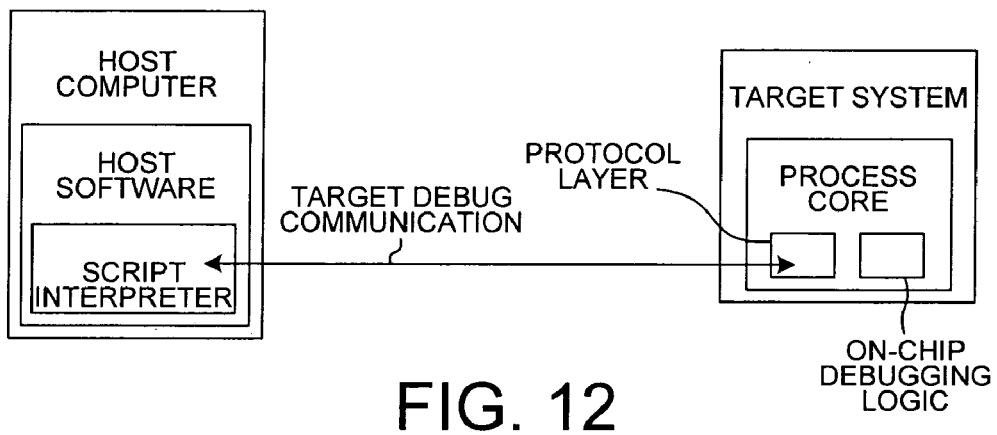

FIG. 12 illustrates a system where the script interpreter executes on the host computer and the script-based interface is within the host computer. The interface is a virtual port on the host computer.

Although the present invention has been described in connection with certain specific embodiments for instructional purposes, the present invention is not limited thereto. Although a particularly compact scripting language and syntax are set forth above, it is to be understood that other scripting languages can be used to provide the standardized script-based interface to the hardware debug device. Javascript (available from Sun Microsystems, Inc.), Gopher (available from Wind River Systems, Inc.), as well as other publicly available script languages may, for example, be used. Although the script-based interface is described in connection with microcommands being microcommands understood by an on-chip debugger on a target processor, the script-based interface may be employed to test and monitor a target that does not have OCD hardware and an OCD serial interface. In one embodiment, the target has a JTAG interface and associated test circuitry. The microcommands are received onto the target via the JTAG interface and are executed by the test circuitry. Results of the tests are returned to the hardware debug device via the JTAG interface. In some embodiments, the target device does not have either on-chip debugger hardware or a JTAG interface. In such embodiments, the hardware debug device can interface and communicate with the target device via another interface of the target device such as, for example, a parallel bus or a serial bus such that the hardware debug device can communicate with a debug agents executing on the target. Although the script-based interface is described above in connection with a target processor, the target device need not be a processor. In one embodiment, the target is an integrated circuit such as a FPGA. Accordingly, various modifications, adaptations, and combinations of various features of the described embodiments can be practiced without departing from the scope of the invention as set forth in the claims.

What is claimed is:

1. A debugging device comprising:
   a first communication interface that couples the debugging device to a host computer;
   a second communication interface that couples the debugging device to a target device; and
   a script interpreter executing on the debugging device, the script interpreter receiving a script from the host computer via the first communication interface, the script comprising a non-compiled string of text characters, the script defining a loop that involves performing a plurality of reads from the target device, the script interpreter interpreting the script and causing the debugging device to communicate with the target device over the second communication interface such that the plurality of reads is carried out.

2. The debugging device of claim 1, wherein the script includes a loop statement, and wherein the loop statement includes an expression and at least one statement.

3. The debugging device of claim 2, wherein said at least one statement is a read statement.

4. The debugging device of claim 3, wherein the expression indicates a number, the number specifying a number of times that a read defined by said read statement is to be performed.

5. The debugging device of claim 2, wherein the script includes a second statement in addition to said at least one statement.

6. The debugging device of claim 1, wherein the performing of the plurality of reads results in an amount of data being retrieved from the target device, and wherein the script includes a statement that causes the amount of data to be sent from the debugging device to the host computer.

7. The debugging device of claim 1, wherein the script is not compiled on the host computer, and wherein the script is not compiled on the debugging device.

8. The debugging device of claim 1, wherein there is no operating system stored on the debugging device.

9. The debugging device of claim 1, wherein the target device comprises an on-chip debugging circuit, and wherein the second communication interface couples the debugging device to the on-chip debugging circuit of the target device.

10. The debugging device of claim 1, wherein the script is communicated from the host computer to the debugging device as a payload of a network packet.

11. The debugging device of claim 1, wherein the script comprises ASCII text characters.

12. A method, comprising:
   receiving a script from a host computer onto a hardware debugging device, the script comprising a non-compiled string of text characters, the script defining a debugging action, the debugging action requiring a plurality of sub-actions be performed;
   interpreting the script;
   generating a plurality of microcommands from the script; and
   sending the plurality of microcommands to a target device, the microcommands causing the target device to perform the plurality of sub-actions.

13. The method of claim 12, wherein the debugging action includes a read of a block of memory locations on the target device, and wherein one of the plurality of sub-actions is a read of one of the memory locations.

14. The method of claim 13, wherein the target device includes a processor, the processor having on-chip debugging hardware, and wherein the microcommands are executed by the on-chip hardware.

15. The method of claim 14, wherein one of the microcommands causes an operation selected from a group consisting of: stop the processor, single-step the processor, read and write to various internal registers within the processor, read and write to a data memory, set breakpoints in code executed by the processor, stuff instructions into the processor, read and write watchpoints, read status registers, and exercise and monitor the processor.

16. The method of claim 13, wherein the target device includes a JTAG interface, and wherein the microcommands are received by the JTAG interface.

17. The method of claim 12, wherein said interpreting of the script occurs on the hardware debugging device, and wherein the script includes a statement that causes data to be sent from the hardware debugging device to the host computer.

18. The method of claim 12, wherein the script includes a loop statement, an arithmetic operator, and a variable.

19. The method of claim 12, wherein the script includes a sleep statement.

20. The method of claim 12, wherein the script includes a break statement.

21. The method of claim 12, wherein the script includes a boolean operator.

22. The method of claim 12, wherein the script comprises ASCII text characters.

23. A debugging device comprising:
a first communication interface that couples the debugging device to a host computer;
a second communication interface that couples the debugging device to a target device; and
means for receiving a script from the host computer, the script defining a debugging action to be taken with respect to the target device, the script comprising a non-compiled string of text characters, the debugging action requiring a plurality of sub-actions to occur, the means also being for interpreting the script and generating therefrom a plurality of microcommands that are sent to the target device.

24. The debugging device of claim 23, wherein the microcommands are performed by the target device such that the sub-actions occur.

25. The debugging device of claim 23, wherein one of the sub-actions involves setting a breakpoint.

26. The debugging device of claim 23, wherein the script includes a loop statement, an arithmetic operator, and a designation of a register internal to a processor of the target device.

27. The debugging device of claim 23, wherein the script comprises ASCII text characters.

28. A debugging device comprising:
a first communication interface that couples the debugging device to a host computer;
a second communication interface that couples the debugging device to a target device; and
a script interpreter executing on the debugging device, the script interpreter receiving a script from the host computer via the first communication interface, the script comprising a non-compiled string of text characters, the script interpreter interpreting the script and causing the debugging device to communicate with the target device over the second communication interface such that a debugging action is performed.

29. The debugging device of claim 28, wherein there is no operating system stored on the debugging device.

30. The debugging device of claim 28, wherein the script includes a sleep statement.

31. The debugging device of claim 28, wherein the script includes a loop statement, and wherein the loop statement includes an expression and at least one statement.

32. The debugging device of claim 31, wherein said at least one statement is a read statement.

33. The debugging device of claim 32, wherein the expression indicates a number, the number specifying a number of times that a read defined by said read statement is to be performed.

34. The debugging device of claim 28, wherein the script comprises ASCII text characters.

35. The debugging device of claim 28, wherein the script comprises NULL terminated ASCII text.

* * * * *